United States Patent [19]

Hohmann

[11] 4,250,439
[45] Feb. 10, 1981

[54] CONTROL INSTALLATION FOR A DENTAL APPARATUS

[75] Inventor: Eugen Hohmann, Bensheim, Fed. Rep. of Germany

[73] Assignee: Siemens Aktiengesellschaft, Berlin & Munich, Fed. Rep. of Germany

[21] Appl. No.: 929,344

[22] Filed: Jul. 31, 1978

[30] Foreign Application Priority Data

Aug. 11, 1977 [DE] Fed. Rep. of Germany ....... 2736276

[51] Int. Cl.$^3$ .............................................. G05B 19/29
[52] U.S. Cl. .................................. 318/601; 318/603; 318/568; 318/569
[58] Field of Search ............... 318/568, 569, 601, 603; 297/330

[56] References Cited

U.S. PATENT DOCUMENTS

| | | | |
|---|---|---|---|
| 3,370,289 | 2/1968 | Hedgcock et al. | 318/603 |
| 3,465,217 | 9/1969 | Kress | 318/603 |
| 3,675,107 | 7/1972 | Barber | 318/603 |
| 3,866,973 | 2/1975 | Heubeck | 297/330 |
| 3,984,146 | 10/1976 | Krestel et al. | 297/330 |
| 4,128,797 | 12/1978 | Murata | 318/568 |

FOREIGN PATENT DOCUMENTS 2119837 11/1972 Fed. Rep. of Germany .

Primary Examiner—Gene Z. Rubinson
Assistant Examiner—Eugene S. Indyk
Attorney, Agent, or Firm—Hill, Van Santen, Steadman, Chiara & Simpson

[57] ABSTRACT

A control installation for a dental apparatus which has at least one part capable of being moved to a selected position of a plurality of positions characterized by the control installation including a drive motor for moving the part to the selected position, a clock pulse generator coupled to the drive motor creating a pulse received by a pulse counter, a read-only memory producing a nominal or reference value indication, a comparator comparing the nominal value indication with the indication of the counted pulses to produce an error signal which is applied to a switching amplifier and then to the drive motor so that the operation of the drive motor depends on the presence of the error signal with the direction of rotation of the drive motor depending upon the operational polarity of the error signal.

3 Claims, 2 Drawing Figures

CONTROL INSTALLATION FOR A DENTAL APPARATUS

BACKGROUND OF THE INVENTION

1. Field of the Invention

The present invention is directed to a control installation for a device for a dental apparatus which has at least one part which is adjustable to selected positions out of a plurality of positions by operation of a drive motor. The control installation utilizes a comparison of an actual value indication to a nominal value indication to produce an error signal utilized to control the operation of the motor.

2. Prior Art

In the case of known control installations which are provided for the purpose of controlling the operation or movement of a dental treatment chair, electro-mechanical transmitters or emitters in the form of potentiometers are utilized as a nominal value and an actual value indicators or transmitters. Examples of these installations are shown in U.S. Pat. Nos. 3,866,973 and 3,984,146. The positioning and adjustment of the potentiometers as well as the programming of the nominal or reference value indicators is relatively costly. In addition, the electro-mechanical actual value indicators of these type devices are inclined to malfunctions.

In another known type of control installation for positioning of an adjustable object such as a chair seat, the desired position is determined by reading a punch card which is inserted into the control installation. Such a device is disclosed in German Offenlegungsschrift No. 2,119,837. Aside from the fact that the handling of the punch cards is comparatively unwieldy because a particular punch card must first be taken from a separate file or storage place, the cards of this type are subject to wear and other distortions. In addition, the transfer installations requires means for scanning the respective punch card which, in addition, represents an interference factor in the chair construction.

SUMMARY OF THE INVENTION

The present invention is directed to providing a control installation of a type in which an actual value indication and a nominal or reference value indication are compared to create an error signal whose value and polarity determine the operation and direction rotation of a drive motor, which installation requires and includes no parts which are difficult to adjust and are susceptible to failure.

To accomplish these tasks, a control installation for a dental apparatus which has at least one part capable of being moved to a selected position of a plurality of positions, said control installation including a drive motor for moving said part to the selected position, means for generating actual value indications based on the actual position of the part, means for producing a nominal or reference value indication for the one position, means for comparing the actual value indication and nominal value indication and creating electrical signal for operating said drive motor to move the part to the selected on position as the improvements comprising the means for creating the actual value indication including means for counting and means for generating a clock pulse, said means for generating a clock pulse being coupled to the drive motor and creating a pulse during operation of the drive motor, said means for counting receiving said pulses and adding or subtracting the received pulses from an existing count depending on the direction of rotation of said drive motor, said means for providing a nominal value indication comprising an electronic read-only memory providing a nominal value indication, said comparator connected to receive the output of the means for counting on one side and the read-only memory on the other side, said comparator producing an error signal based on the comparison of the outputs of the counting means and the read-only memory and supplying the error signal to a switching amplifier having an output connected to the drive motor so that operation of the drive motor depends on the presence of an error signal with the direction of rotation of the drive motor depending upon the operational polarity of the error signal.

Further advantages and objects of the present invention will be readily apparent from the appended claims and the discussion of the preferred embodiments and drawings.

DESCRIPTION OF THE PREFERRED EMBODIMENTS

Figure 1:
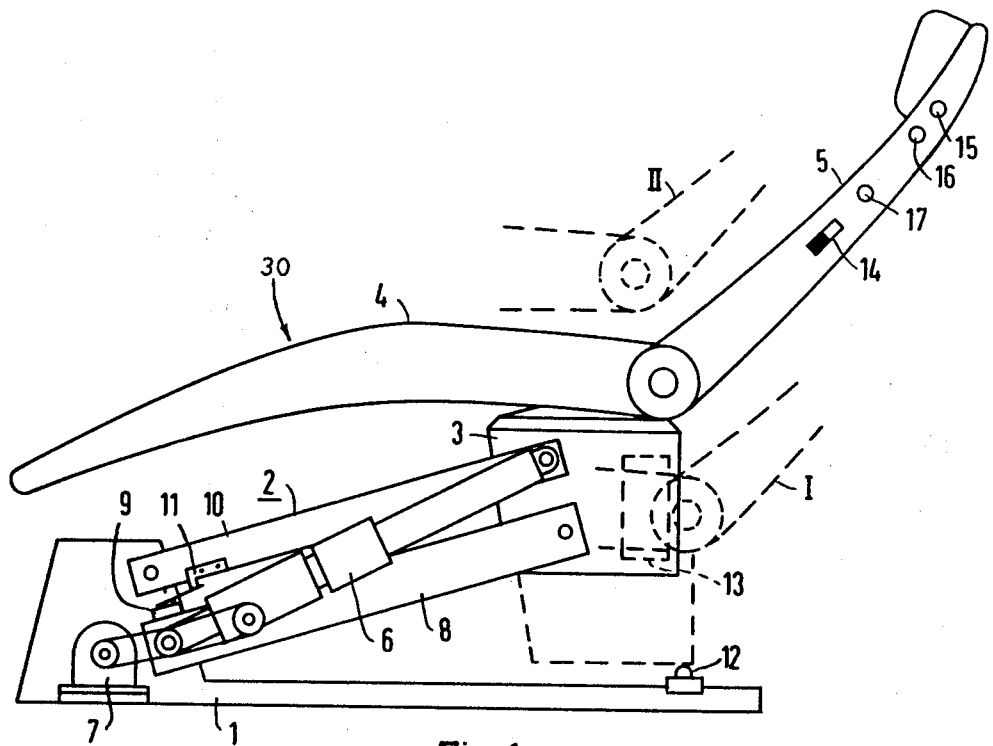
FIG. 1 is a schematic side view of a dental treatment chair in accordance with the present invention.

The principles of the present invention are particularly useful in a dental chair generally indicated at 30 in FIG. 1. The dental chair 30 includes a base part 1 to which a parallelogram carrier arm 2 is coupled or linked with the free end of the carrier arm 2 supporting a carrier 3 for a seat 4 that has a back rest 5. The seat 4 and back rest 5, which are pivotably connected together, form the upper part of the chair which can be adjusted or shifted in height by means of the parallelogram arm 2 between a lowermost position I generally illustrated in broken lines and the uppermost position II which is also partially illustrated in broken lines.

To cause adjustment or displacement of the seat 4 between the two positions or to any intermediate positions such as illustrated in bold lines, an electro-mechanically driven worm drive 6 with a spindle extends diagonally between two coupling points on the parallelogram arm 2. To control the operation of the worm gear, a control installation includes a drive motor 7, which is arranged outside of the parallelogram carrier arm 2 in a housing of the base part 1. The torque of the drive motor 7 is transferred to a spindle of the worm gear via V-belts and an intermediate shaft which are not further designated.

The parallelogram carrier arm 2 contains two bars or rods 8 and 10. The lower bar arm 8 is provided with a switch 9, which is actuated by means of a switching nose or projection 11, which is secured on the upper arm 10 so that when the parallelogram arm 2 reaches a predetermined given position to position the chair at a given height, the switch 9 is actuated. As shall be explained later, the switch 9 serves the purpose of triggering a correction operation. In addition to the switch 9, a switch 12 which is an emergency stop switch is arranged on the base part 1 and can be either actuated by the foot of the operating personnel or individual or due to contact by the carrier 3 when it assumes the lowermost position.

In the carrier 3, a program control unit 13 is positioned and contains the various electrical components necessary for storing various bits of information as well as for retrieving or addressing the storage to obtain these pieces of information. The program control unit 13 is also part of the control installation.

A flip or toggle switch 14 is positioned on the back rest 5 and can be manually moved between two positions to cause either a downward movement or displacement of the height of the seat or an upward movement. The manual switch 14 has a rest position in both switching directions and after contact of the switch to cause the actuation thereof ceases, the switch is biased to the rest position with the switch being opened. In addition to the switch 14, which directly controls operation of the drive motor 7, the back of the chair or back rest 5 has a pair of program switches 15 and 16 for designating selected programs so that the height of the chair will be moved to a preselected position depending on which of the two programs is selected. A program input switch 17 is also positioned on the back of the chair.

Figure 2:
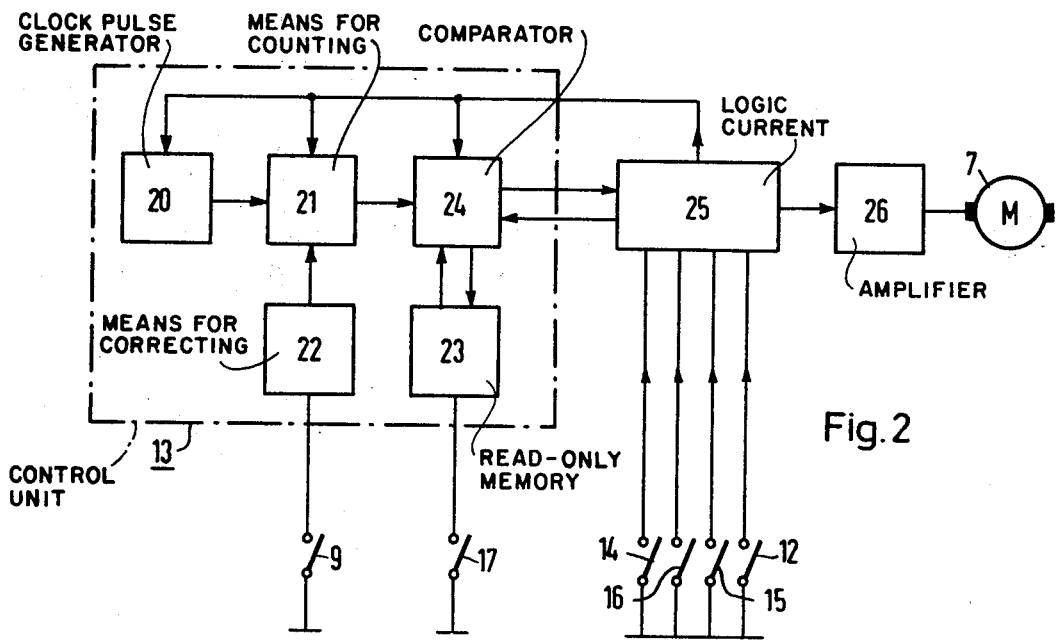
FIG. 2 is a basic circuit diagram of a control device for adjusting the seating height of the chair illustrated in FIG. 1.

Circuit diagram for the control installation for adjusting the height of the seat 4 relative to the base 1 is illustrated in FIG. 2. An actual value indication for the position or height of the seat 4 is formed from the switch on time and the rotational direction of the drive motor 7. The switch on time is obtained from the supply or line voltage connected to the drive motor 7. Means for producing a clock pulse such as a generator 20 delivers corresponding to the supply line frequency of the motor a pulse to a means for counting such as the member 21. Depending upon whether the motor is rotating to raise the seat 4 or is rotating in the opposite direction to lower the seat 4, the counting means will add or subtract the pulses from the existing count. If, for example, the motor is switched on in a rotational direction to raise the seat, the pulses created by the member 20 are added to the previously produced pulses. However, if the motor is moved to lower the chair, the pulses from the member 20 are subtracted from the previously recorded total of pulses so that as the motor 7 continues to lower the seat, the count continues to decrease.

Since deviations can occur in the counting member 21, for example, due to a slow down or slippage of the drive motor caused by different loads in the chair and since these deviations can lead with increasing travel or running time to a not too negligible error, means for correcting the counter reading illustrated by member 22 is provided. The member 22 receives an input signal from the switch 9, when the chair reaches a predetermined position which causes the tip or nose 11 to actuate the switch 9. When the member 22 receives the switching pulse from the switch 9, it causes a comparison of the counter reading of the counter member 21 and the reading of the correction member 22. In the event that there is a deviation the counter reading of the member 21 is changed to the reading of the correction member 22. Thus, each time the seat 4 moves through the given position, a comparison and correction is made by the member 22.

In order to store the different program, which corresponds to different positions for the seat height and thus requires different nominal values or reference values, an electronic read-only memory 23, for example, an EA-PROM-memory is utilized. The memory has an output connected to a comparator 24, which will compare the actual value indication from the counter 21 to the reference or nominal value indication produced by the program in the memory 23 to produce an error signal.

The error signal from the comparator 24 is passed through a combinational logic circuit 25 to a signal amplifier 26 which applies the signal to the drive motor 7. The combinational logic circuit 25 receives inputs from the actuation or toggle switch 14 as well as the program selection switches 15 and 16 which, when actuated, cause access to a given selected program in the memory 23. The circuit 25 checks whether the switching demand or control demand, respectively, are correct. If, for example, conflicting demands are present for the operational circuit which can occur as a result of switching both switches 15 and 16 and simultaneously requesting two different programs, the circuit 25 will refuse to transmit or forward the command. If, on the contrary, the control command is clear, it is transmitted so that the desired program is accessed from the memory and the command or error signal is applied through the amplifier 26 to the drive motor 7. Simultaneously with the operation of the motor 7, the clock pulse generator 20 and the counter 21 are requested to form the actual value. Thus, the counter 21 jointly runs or operates for the period of which the motor 7 is switched on.

If a program which is established by the program memory 23 is accessed through the actuation of the switch 15, comparator 24 then checks whether there is a difference between the counter reading of the counter member 21 and the counter reading of the reference reading or nominal value of the memory element 23. If such a difference is present and depending on the operational sign of this difference, an error signal for a switching on of the motor with the particular required rotational direction proceeds via the switching amplifier 26. If the counter reading such as the actual counter reading value and the reference or nominal values agree, no error signal exists and the comparator 24 then triggers or actuates a switching off of the motor 7. Switching off of the motor 7 also takes place if the emergency stop key 12 is actuated.

In order to read in or store a program in the memory 23, the chair must first be brought by means of the manual operation to the desired position. This will be accomplished through actuation of a manual switch 14. Once the chair has been brought to the desired position, actuation of the program input key 17 causes the program memory 23 to be prepared for reception of the positive position values of the counter from the comparator 24. If subsequently, one of the program switches or keys 15 or 16, for example key 15, is pressed which key 15 is now associated with this new program, the memory element 23 will record the present actual value from the counter member 21. Subsequent access to the new program will occur when key or switch 15 will be actuated. In a similar manner, another program can be read in or stored in the memory which can be accessed via one of the other switches such as 16.

For the reason of simplicity, the principle of the control installation is described only for the adjustment or shifting or displacement of the chair height. The control of the inclination of the back rest 5 can be carried out in a similar manner.

Although various minor modifications may be suggested by those versed in the art, it should be understood that I wish to embody within the scope of the patent warranted hereon, all such modifications which reasonably and properly come within the scope of my contribution to the art.

I claim:

1. In a control installation for a dental treatment chair which has at least one part capable of being moved to a selected position of a plurality of positions, said part being selected from a seat moveable to different heights and a back rest having changeable inclinations, said control installation including a drive motor for moving said part to the selected position, means for generating actual value indications based on the actual position of the part, means for producing a nominal value indication for the selected position, means including a comparator for comparing the actual value indication and the nominal value indication and creating an electrical signal for operating said drive motor in the necessary direction to move the part to the selected one position, the improvements comprising the means for creating the actual value indication including means for counting and means for generating a clock pulse, said means for generating a clock pulse being coupled to the drive motor and creating a pulse during operation of the drive motor, said means for counting receiving said pulse and adding or subtracting the received pulse to the existing count depending on the direction of rotation of said drive motor, said means for providing the nominal value indication comprises an electronic read-only memory providing a nominal value indication, said comparator having an output connected to a combinational logic circuit, said combinational logic circuit checking the switching command from program switches and transmitting said commands to the memory, said combinational logic circuit blocking transmission of the switching commands when conflicting and transmitting the commands when they are correct, said comparator being connected to receive the output of the means for counting on one side and the read-only memory on another side, said comparator producing an error signal based on a comparision of the outputs of the counting means and the read-only memory and supplying the error signal to the combinational logic circuit and then to a switching amplifier having an output directed to the drive motor so that operation of the drive motor depends on the presence of an error signal with the direction of rotation of the drive motor depending upon the operational polarity of the error signal.

2. In a control installation according to claim 1, wherein the power line frequency of the drive motor is utilized as the clock pulse generator frequency for the means for generating a clock pulse.

3. In a control installation for a dental treatment chair which has at least one part capable of being moved to a selected position of a plurality of positions, said part being selected from a seat moveable to different heights and a back rest having changeable inclinations, said control installation including a drive motor for moving said part to the selected position, means for generating actual value indications based on the actual position of the part, means for producing a nominal value indication for the selected position, means including a comparator for comparing the actual value indication and the nominal value indication and creating an electrical signal for operating said drive motor in the necessary direction to move the part of the selected position, the improvements comprising the means for creating the actual value indication including means for counting and means for generating a clock pulse, said means for generating a clock pulse being coupled to the drive motor and creating a pulse during operation of the drive motor, said means for counting receiving said pulse and adding or subtracting the received pulse to the existing count depending on the direction of rotation of said drive motor, said means for providing the nominal value indication comprises an electronic read-only memory providing a nominal value indication, said installation including means for correcting a reading of the means for counting, said means for correcting having means for sensing a definite position of a part including a switch member for determining the movement of an adjustable part relative to a fixed reference point of a chair, said switch member being actuated to produce a switching signal for applying to the means for correcting as the adjustable part reaches said fixed reference point, said installation including a combinational logic circuit being interposed between an output of the comparator and a switching amplifier having an output directed to the drive motor, said combinational logic circuit receiving the output of manual adjustment switches and applying them directly through said amplifier to said motor, said logic circuit receiving the output signals of program selection switches and applying the signal through the comparator directly to the read-only memory, said combinational logic circuits transmitting said signals when clear and blocking transmission when conflicting signals are received, said comparator being connected to receive the output of the means for counting on one side and the read-only memory on the other side, said comparator producing an error signal based on the comparison of the outputs of the counting means and the read-only memory and supplying the error signal through the logic circuit to the switching amplifier so that the operation of the drive motor depends on the presence of an error signal with the direction of the rotation of the drive motor depending upon the operational polarity of the error signal.

* * * * *